Patented Sept. 15, 1931

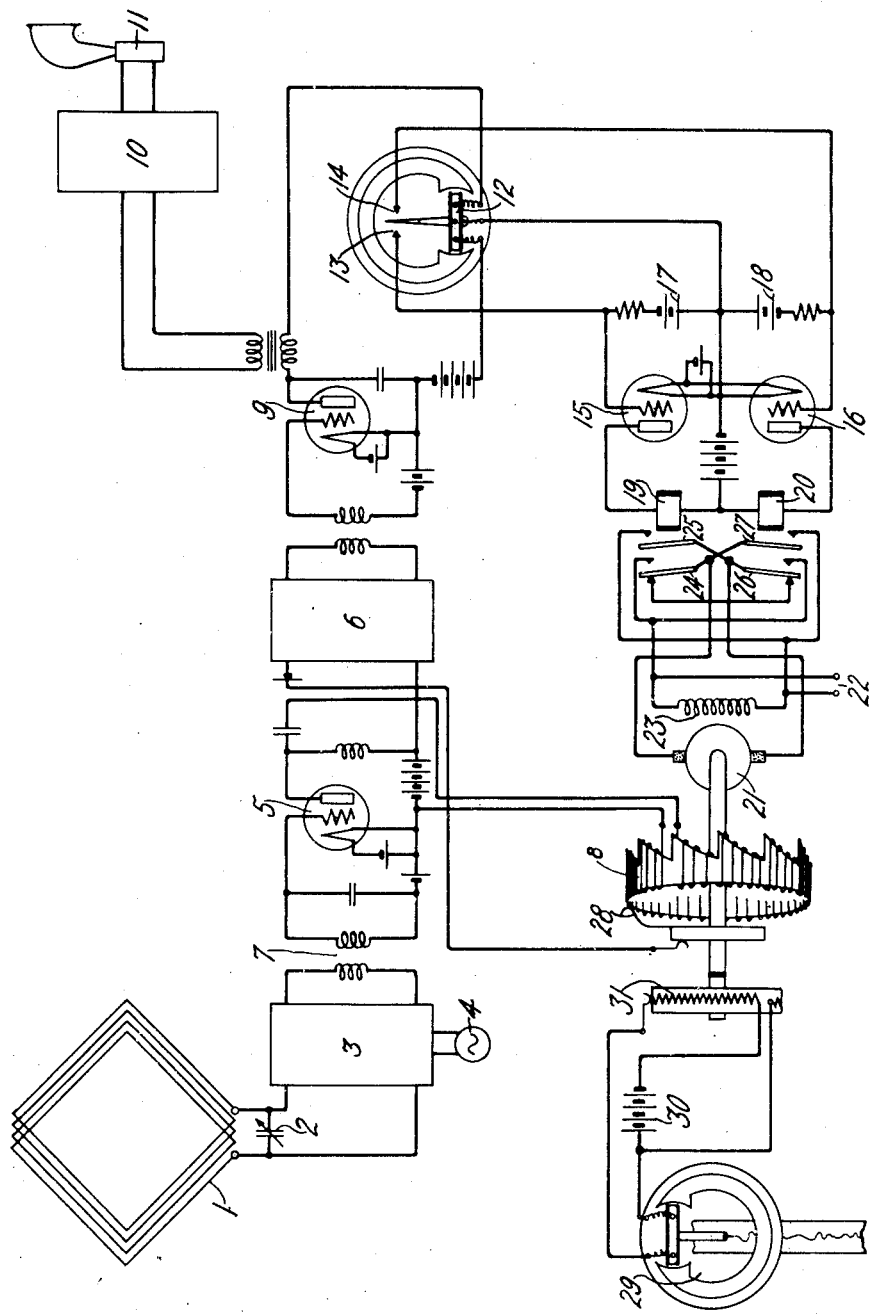

1,823,360

UNITED STATES PATENT OFFICE

RAYMOND A. HEISING, OF MILLBURN, NEW JERSEY, ASSIGNOR TO WESTERN ELECTRIC COMPANY, INCORPORATED, OF NEW YORK, N. Y., A CORPORATION OF NEW YORK

SIGNALING SYSTEM

Application filed July 6, 1925. Serial No. 41,708.

This invention relates to signaling systems and more particularly to a method and means for measuring the strength of a received signal.

Due to the relatively low intensity of the signals received at a radio receiving station, it is impractical to directly connect a graphic recorder in the receiving circuit in order to obtain a record of the intensity of the received signal. An ordinary graphic recorder requires a current many times greater than that produced by received signals of maximum intensity even though several stages of amplification are employed. Since the amplitude of a detected signal varies as the square of the amplitude of the received wave, a recorder constructed in the usual manner would be operative over only a small range, as the upper values would be off the scale or the lower values would be unreadable, according to the scale selected. Furthermore, the quality of a received signal is frequently poor due to increases or decreases in the strength of the wave, commonly called fading caused by variations in the transmission medium.

It is an object of this invention to measure and record the strength of a received signal. Another object is to produce a continuous graphic record of the variation in amplitude of a received signal. A further object is to maintain constant the strength of the received signal energy in a radio receiver. A feature of the invention is to provide a system in which available indicating or recording instruments may be used to indicate variations in signal strength over ranges of 100 to 1 or more with approximately equal accuracy. Another feature is to provide a system in which a signal may be recorded or indicated in convenient units, such as transmission units.

These objects and others which will be apparent as the nature of the invention is disclosed, are accomplished by employing in connection with a radio receiving apparatus including a detector and amplifying means, means for varying the amount of amplification or gain as the strength of the received signal varies.

In the particular system, to be hereinafter described, the gain obtained in the amplifier is controlled by means of a potentiometer adapted to vary the ratio of the current in two successive stages of amplification. A graphic recorder is connected in such a manner that it records the position to which the above mentioned potentiometer is adjusted. By making a continuous record of the adjustments of the potentiometer which are required to maintain constant the signal in the output circuit of the amplifier, the strength of the original signal may be ascertained.

The novel features which are believed to be characteristic of this invention will be pointed out with particularity in the claims appended hereto. However, the invention itself, its objects and advantages, the manner of its organization and the mode of its operation will be better understood by referring to the following description taken in connection with the accompanying drawing forming a part thereof, in which the single figure illustrates a diagrammatic representation of one type of signaling system embodying this invention.

The incoming signal waves may be received over a transmission line or by means of a radio antenna. For the purpose of completely and clearly disclosing a practical arrangement embodying the invention, it will be hereinafter described as applied to a radio receiving system.

The figure shows a loop aerial 1, tuned by condenser 2, adapted to impress the incoming wave upon a radio receiving system herein shown as including a detector 3, a source of beating oscillations 4 and amplifying devices 5 and 6. Local oscillations supplied from source 4 are combined in detector 3 with the incoming signals to produce a wave of desired intermediate frequency which is impressed upon amplifier 5 through transformer 7 tuned to the intermediate frequency. Obviously, a tuned circuit or wave filter, selective of the intermediate frequency, could be used in place of the resonant transformer 7.

Amplifier 5 is coupled to amplifier 6, which may include any number of stages, by means of potentiometer 8 adapted to vary the ratio of the output potential of amplifier 5 to the potential applied to the input circuit of amplifier 6. Signal energy of intermediate frequency which has been amplified to the desired intensity in the above mentioned amplifiers is rectified in the device 9, and used to operate suitable indicating means. Thus the rectified current may be impressed upon a device 10 capable of amplifying low frequency signals and used to actuate suitable signal responsive means 11, herein shown as a loud speaker.

The direct current component of rectified current in the output circuit of detector 9 varies with the intensity of the signaling impulses and is supplied to a three-position relay 12, the movable contact of which is adapted to engage the contacts 13 and 14, respectively, as the amplitudes of the direct current impulses are greater or less than a predetermined value. Space discharge devices 15 and 16 have their grids polarized by sources 17 and 18, respectively, so that substantially no space current flows through them. Relays 19 and 20 are adapted to be energized by the space current flowing through these tubes. Relay 12 operates to short-circuit source 17 or 18 as its movable contact engages the contact 13 or 14, respectively.

Relays 19 and 20 are so connected that in the position shown, corresponding to that in which the three-position relay is in a neutral position, the armature of motor 21 is disconnected from the line 22 and is short-circuited. Field 23 of this motor is permanently connected across line 22.

When relay 12 operates to engage contact 13, the grid polarizing source 17 of vacuum tube 15 is short-circuited and the potential of the grid becomes sufficiently positive to enable current to pass through its anode circuit through the relay 19 to actuate armatures 24 and 25 and connect the armature of motor 21 across line 22.

When contact 14 is engaged by the movable contact of relay 12, relay 20 operates in a similar manner to actuate armatures 26 and 27 by means of which the armature of motor 21 is connected across line 22 in a manner such that current flows through the motor armature in a direction opposite to which it flows when the relay 19 is energized.

Movable arm 28, operated by the rotation of motor 21, makes contact with potentiometer 8 in such manner that the ratio of the voltage across the potentiometer to the voltage applied to amplifier 6 is determined by the position of the motor armature.

Potentiometer 8 is preferably wound in such a manner that the resistance between the movable contact and one end of the winding is an exponential function of the angular position of the movable member. This may be accomplished in one way by constructing the potentiometer in sections as shown, each section being so designed that the resistance is an exponential function of the number of turns. In order to avoid abnormally large or abnormally small turns as the ends of the winding are approached, the sections are made of substantially the same size and are wound with approximately the same size wire, and a resistance which has a value sufficient to produce the desired resistance for the section as a whole is connected in parallel to each section.

By winding the potentiometer exponentially, the accuracy of setting or stopping of the motor by the relays will be the same at all values of field strengths. Other windings may be used if desired for other effects or relations.

Graphic recorder 29 is connected across battery 30 by means of potentiometer 31 which is mounted to rotate with the armature of motor 21. Variations in the resistance of the potentiometer 31 as the motor rotates will control the application of varying potentials to recorder 29 from battery 30 which will actuate the recorder to produce a graphic record of the amount of rotation of the potentiometer arm 28.

In the normal operation of this system the current in the plate circuit of the detector 9 will be such that the armature of relay 12 is kept in the position shown; however, when the strength of the received signal impressed upon detector 9 varies from a predetermined value, contact 13 or 14 will be closed. Relay 19 or 20 will be actuated to control the rotation of motor 21 until such an adjustment of potentiometer 8 is effected that the gain of amplifiers 5 and 6 is adjusted to restore to its original predetermined intensity the energy supplied to the rectifier 9. When this occurs, relay 12 assumes a neutral position, relays 19 and 20 assume the position shown, and the armature of motor 21 is disconnected from the line and is short-circuited, to give a braking effect which will immediately cause the motor to come to rest. Since the movable arms of potentiometer 8 and potentiometer 31 are mechanically connected to the same shaft operated by motor 21, the rotation of the motor will produce equal angular movements of the two arms. The amount of rotation necessary to compensate for any variation in field strength will determine the potential applied to recorder 29 by potentiometer 31 and will be recorded by the recorder. The strength of the incoming signal may be determined by noting the amount of rotation necessary to vary the gain in the receiving set by an amount such that the amplitude of the detected current remains constant.

As the operation of the motor and potentiometer 8 is practically instantaneous with variations in signal intensity, the strength of the signal current supplied to device 11 will be maintained constant irrespective of variations of the received signal.

By including amplifier 5 between detector 3 and potentiometer 8, the incoming high frequency wave is more effectually suppressed, due to the selective action of transformer 7. Moreover the intensity of the potential applied to the amplifier 6 is raised to such a value that it may be more readily and accurately controlled by the potentiometer.

Any desired relation may be obtained between the strength of the received wave and the record made by the recorder 29, by varying the relation between the resistance of potentiometer 31 and the angular movement of its movable element. In the case of a potentiometer wherein the resistance is directly proportional to its angular position, the indication obtained by the recorder will be a logarithmic function of the strength of the received wave. Such a recorder will then indicate variations of field strength in transmission units.

Although this invention has been shown as applied to a particular system, however, it is not to be limited thereto, but only in accordance with the scope of the invention as defined by the following claims.

What is claimed is:

1. In a signaling system, means for receiving a signal, means for subjecting said signal to a variable amount of amplification, means for varying said amplification in response to the strength of the received signal to produce an amplified signal having substantially constant amplitude, and means for indicating the logarithm of the amplitude of the original received signal.

2. In a system of the class described, means for receiving a signal, means for amplifying said signal, a potentiome er for controlling the amount of amplification to which said signal is subjected, means for controlling the position of said potentiometer comprising a relay actuated by said received signal, whereby said potentiometer is adjusted in such a manner that the strength of the amplified signal remains substantially constant, and means operable under the influence of said potentiometer to record a graph whose departure from normal is a logarithmic function of the departure from normal of the strength of received signals.

3. A signal receiving system comprising a detector and a source of local oscillations, means for impressing the incoming signal and local oscillations upon said detector to produce an intermediate frequency wave, a selective circuit for selecting and a space discharge amplifier for amplifying said intermediate frequency wave, a potentiometer for varying the intermediate frequency energy applied to said amplifier, means for rectifying said intermediate frequency signal, a relay actuated by said rectified current adapted to control said potentiometer in such a manner that the strength of said rectified current remains substantially constant, and a graphic indicating means for recording the adjustment of said potentiometer.

4. In a signal receiving system, means for receiving a transmitted wave, a source of local oscillations, means for combining said wave with oscillations from said source to produce a wave of intermediate frequency, means for amplifying said intermediate frequency wave, a logarithmic potentiometer for controlling the amount of said amplification, means for rectifying said intermediate frequency wave, a signal responsive device actuated by the rectified current, a three-position relay actuated by said rectified current, a plurality of space discharge devices, means controlled by said relay for governing the impedance of said devices, a motor operatively associated with said potentiometer, relays actuated by said discharge devices whereby the rotation of said motor is controlled by said three-position relay, means whereby in one position of said three-position relay the armature of said motor is short circuited, a second potentiometer associated with said first mentioned potentiometer, a graphic recorder controlled by said second mentioned potentiometer, whereby the adjustment of said first mentioned potentiometer is indicated, said system being adapted to impress upon said signal responsive device a current of substantially constant amplitude.

5. In a signaling system, means for receiving and detecting a transmitted signal, means for indicating the strength of the signal received comprising a graphic recorder, and devices controlled by said detector whereby the record made by said recorder varies in accordance with the powers to which a given number must be raised to represent the absolute value of received energy.

6. A receiving system comprising an amplifier for received energy, means for varying the amplifying power of said amplifier, means for maintaining the amplified energy supplied by said amplifier constant within narrow limits, said means for maintaining including a displaceable element, means whereby unit displacements of said element correspond to changes in amplification proportional to powers of a number, and an element for linearly recording displacements of said displaceable element.

7. A receiving system comprising an amplifier for received energy, means operable under the influence of variations in received energy for varying the amplifying power of said amplifier, means for maintaining the amplified energy supplied by said amplifier constant within narrow limits, said means for maintaining including a displaceable element, and means whereby unit displacements of said element correspond to changes in amplification proportional to powers of a number.

In witness whereof, I hereunto subscribe my name this 29th day of June A. D., 1925.

RAYMOND A. HEISING.